United States Patent
Kuraki et al.

(10) Patent No.: US 9,749,046 B2
(45) Date of Patent: Aug. 29, 2017

(54) SIGNAL TRANSMISSION DEVICE, SIGNAL TRANSMISSION METHOD, SIGNAL RECEPTION DEVICE, AND COMMUNICATION SYSTEM

(71) Applicant: FUJITSU LIMITED, Kawasaki-shi, Kanagawa (JP)

(72) Inventors: Kensuke Kuraki, Ichikawa (JP); Ryuta Tanaka, Machida (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 14/807,115

(22) Filed: Jul. 23, 2015

(65) Prior Publication Data
US 2016/0080079 A1    Mar. 17, 2016

(30) Foreign Application Priority Data
Sep. 17, 2014    (JP) .................................. 2014-188856

(51) Int. Cl.
*H04B 17/00*    (2015.01)
*H04B 10/116*    (2013.01)

(52) U.S. Cl.
CPC .................................. *H04B 10/116* (2013.01)

(58) Field of Classification Search
CPC .................................................... H04B 10/116
USPC ................................................................ 398/25
See application file for complete search history.

(56) References Cited

U.S. PATENT DOCUMENTS

| | | | | |
|---|---|---|---|---|
| 5,075,792 A | * | 12/1991 | Brown | H04B 10/40 341/69 |
| 5,349,463 A | * | 9/1994 | Hirohashi | H04B 10/1149 375/211 |
| 5,600,471 A | * | 2/1997 | Hirohashi | H04B 10/11 370/491 |
| 5,926,302 A | | 7/1999 | Hirohashi et al. | |
| 6,426,820 B1 | * | 7/2002 | Verzulli | G08C 23/04 340/12.54 |
| 7,391,975 B2 | * | 6/2008 | Oettinger | H04J 3/0664 370/315 |
| 7,567,759 B2 | * | 7/2009 | Kanesaka | H04B 10/66 398/128 |

(Continued)

FOREIGN PATENT DOCUMENTS

| | | |
|---|---|---|
| CN | 103840880 A | 6/2014 |
| EP | 1 564 914 A1 | 8/2005 |

(Continued)

OTHER PUBLICATIONS

Extended European Search Report issued Feb. 9, 2016 in corresponding European Patent Application No. 15178831.2.

(Continued)

*Primary Examiner* — Juan A Torres
(74) *Attorney, Agent, or Firm* — Staas & Halsey LLP

(57) ABSTRACT

A signal transmission device, includes a processor; and a memory which stores a plurality of instructions, which when executed by the processor, cause the processor to execute: irradiating incoming light, which includes one or more symbols with which the incoming light has been varied in response to a signal to be transmitted, on an arbitrary object with a first intensity; and controlling an amplitude of the first intensity on a basis of a reflectance of the incoming light irradiated on the object.

18 Claims, 13 Drawing Sheets

(56) References Cited

U.S. PATENT DOCUMENTS

| | | | |
|---|---|---|---|
| 2003/0090765 A1 | 5/2003 | Neff et al. | |
| 2008/0237445 A1* | 10/2008 | Ikeno | G01S 17/32 250/205 |
| 2011/0044701 A1 | 2/2011 | Schenk et al. | |
| 2014/0056588 A1 | 2/2014 | Schenk et al. | |
| 2014/0151535 A1* | 6/2014 | Mori | G01S 17/42 250/214.1 |

FOREIGN PATENT DOCUMENTS

| | | |
|---|---|---|
| JP | 3-10483 | 1/1991 |
| JP | 2004-229273 | 8/2004 |
| JP | 2004-297425 | 10/2004 |
| JP | 2013-21458 | 1/2013 |
| WO | 2009/136312 A1 | 11/2009 |

OTHER PUBLICATIONS

Chinese Office Action dated Jun. 27, 2017 in related Chinese Patent Application No. 201510504895.7 (7 pages) (11 pages English Translation).

* cited by examiner

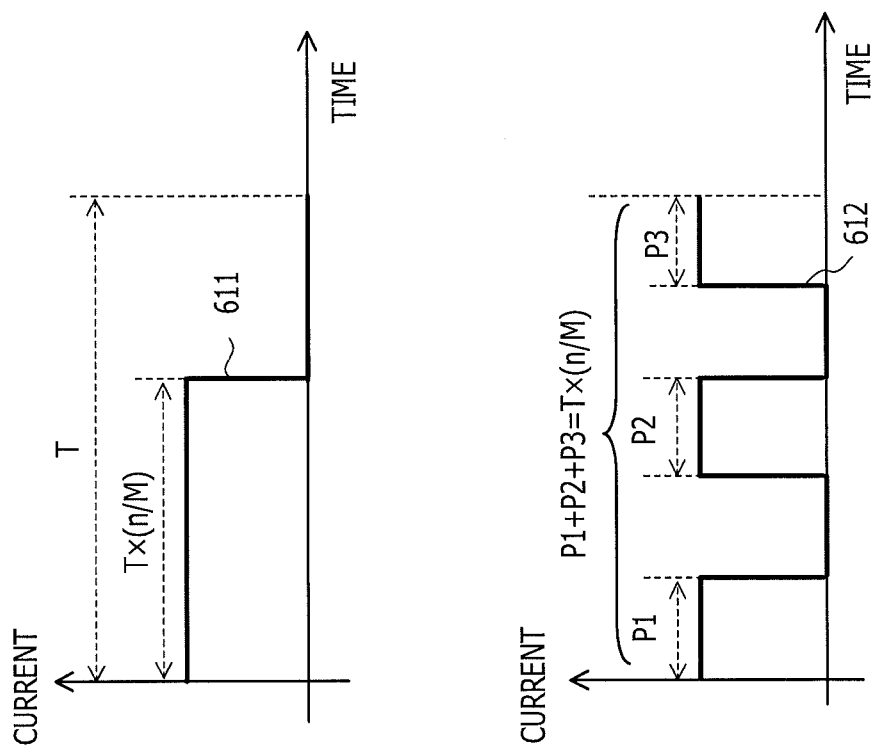
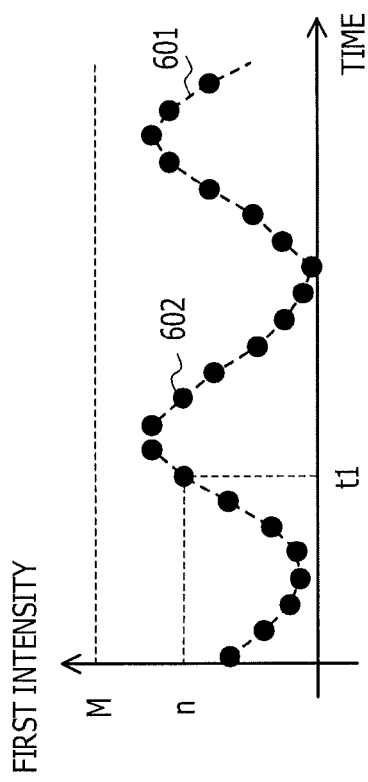

SIGNAL TRANSMISSION DEVICE, SIGNAL TRANSMISSION METHOD, SIGNAL RECEPTION DEVICE, AND COMMUNICATION SYSTEM

CROSS-REFERENCE TO RELATED APPLICATION

This application is based upon and claims the benefit of priority of the prior Japanese Patent Application No. 2014-188856, filed on Sep. 17, 2014, the entire contents of which are incorporated herein by reference.

FIELD

The embodiment discussed herein is related to a signal transmission device and a signal transmission method for transmitting a signal, for example, utilizing light, a computer-readable non-transitory medium, a signal reception device, and a communication system.

BACKGROUND

Conventionally, light emitting diode (LED) is widely utilized as an illumination light source. In comparison with an incandescent lamp or a fluorescent tube, the LED includes a characteristic that the response speed is high. A visible light communication technology is investigated which makes use of the characteristic to cause the LED to flicker at a rate at which the flickering may not be recognized by the eyes of the human being thereby to superpose information (which may be referred to as signal) on the illumination light to be emitted from the LED to perform communication. The visible light communication technology is examined such that it is, for example, utilized for communication applications at a place at which use of radio waves is restricted, information transmission where information transmission is restricted to a range within which light may reach such as the inside of a room, intelligent transport systems (ITS) or the like.

For example, Japanese Laid-open Patent Publication No. 03-10483 discloses a certain one information transmission system that includes a light emission unit whose given region is caused to emit light to transmit information and a light reception unit for decoding information from images obtained by imaging the given region in a time series. The information transmission system discloses that the light emission unit emits light color-modulated by performing multi-leveling to at least three values in response to information of the given region and the light reception unit decodes the information on the basis of the multi-leveled color modulation information of the given region.

Further, for example, International Publication No. WO 2009/136312 discloses a technology that a certain one optical module includes at least two primary light sources for emitting primary color light and data is incorporated into light by modulating a color coordinate of light to be emitted from the primary light sources in response to data to be embedded. Since the sensitivity of the eyes of the human being to a color in variation of the color is lower than that in variation of the intensity, where the optical module described above is utilized for an illumination system, data may be embedded into light to be emitted without degrading the function for illumination.

SUMMARY

In accordance with an aspect of the embodiments, a signal transmission device, includes a processor; and a memory which stores a plurality of instructions, which when executed by the processor, cause the processor to execute: irradiating incoming light, which includes one or more symbols with which the incoming light has been varied in response to a signal to be transmitted, on an arbitrary object with a first intensity; and controlling an amplitude of the first intensity on a basis of a reflectance of the incoming light irradiated on the object.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 8A is a diagram illustrating a time variation of a first intensity per unit time period of a light emitting element determined in response to a light emission pattern;

FIG. 8B is a diagram illustrating a relationship between a first intensity of a light emitting element and a period within which current is supplied to the light emitting element, namely, a period within which the light emitting element is kept on, in accordance with a pulse width modulation (PWM) method;

DESCRIPTION OF EMBODIMENT

Figure 1:
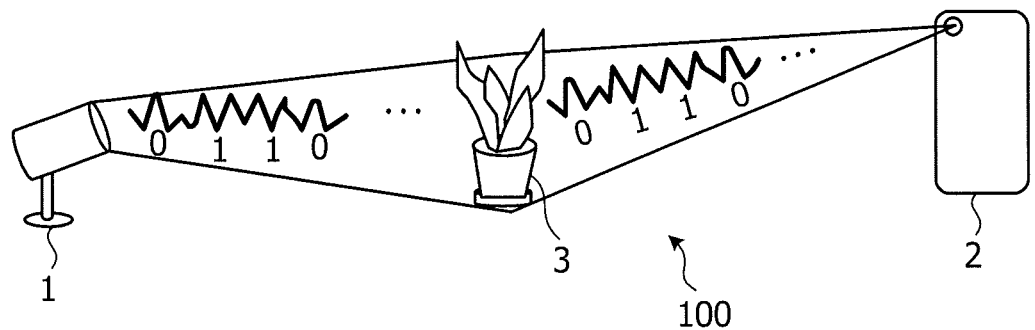
FIG. 1 is a schematic view depicting a general configuration of a communication system according to an embodiment.

First, a location of a subject in the related art is described. It is to be noted that the location of the subject has been newly found out as a result of detailed investigation of the related art by the inventors and has not been known heretofore. In the information transmission system described above, a value of data to be transmitted is allocated to each hue. Further, in the optical module described above, logical values represented by one bit or a plural number of bits are allocated to individual color coordinates. Therefore, in the information transmission system and the optical module disclosed heretofore, in order for a device at the reception side to accurately decode information superposed on light emitted from a device at the transmission side, it is significant for the device at the reception side to directly receive the light emitted from the device at the transmission side. This is because, where the device at the reception side may not directly receive the light emitted from the device at the transmission side and, for example, the light emitted from the device at the transmission side is reflected by an object first and then received by the device at the reception side, there is the possibility that the color of the received light may have been made different from the original color of the light by the object. Where the color of the received light is different from the color of the light emitted from the device at the transmission side, since the color of the received light is different from a color corresponding to the value of data included in the superposed information, it is difficult for the device at the reception side to accurately decode the information superposed on the light emitted from the device at the transmission side. In other words, even where the reception device may not directly receive light on which information is superposed, a signal transmission device that may transmit information superposed on light accurately to a reception device has not been proposed by the related art.

Working examples of a signal transmission device, a signal transmission method and a signal transmission program according to an embodiment are described in detail with reference to the drawings while technical matters or subjects found out newly by intensive verification of the inventors described above are taken into consideration. Further, working examples of a signal reception device corresponding to the signal transmission device and a communication system in which the signal transmission device and the signal reception device are utilized are described in detail with reference to the drawings.

Working Example 1

In a communication system disclosed in a working example 1, a signal transmission device varies a characteristic of light, which is to be emitted from an irradiation unit (details of the irradiation unit are hereinafter described), in a time series in response to the value of a symbol included in information (which may be referred to as signal) to be transmitted. Thereupon, the signal transmission device selectively determines a light emission pattern, which is a pattern of variation of a characteristic of the light in a time series, in response to the value of a symbol included in information to be transmitted. Consequently, even if a signal reception device (details of the signal reception device are hereinafter described) may not directly receive the light emitted from the signal transmission device but receives the light after the light is reflected by some object, the signal reception device may decode the superposed information by extracting the pattern of the time series variation of the characteristic of the received light.

FIG. 1 is a schematic view depicting a general configuration of a communication system according to an embodiment. A communication system 100 includes a signal transmission device 1 and a signal reception device 2. The signal transmission device 1 superposes information to be transmitted on light to be emitted from an irradiation unit 14 provided in the signal transmission device 1. Meanwhile, the signal reception device 2 includes an image pickup unit, which picks up an image of an image pickup range illuminated with light from the signal transmission device 1 and including an arbitrary object 3, successively in a time series. The signal reception device 2 decodes, from a plurality of images obtained from the image pickup unit and lined up in a time series, information superposed on the light. It is to be noted that, while the communication system 100 in the working example 1 includes only one signal reception device 2, the number of signal reception devices 2 included in the communication system 100 is not limited to one. Namely, the communication system 100 may include a plurality of signal reception devices 2.

Figure 2:
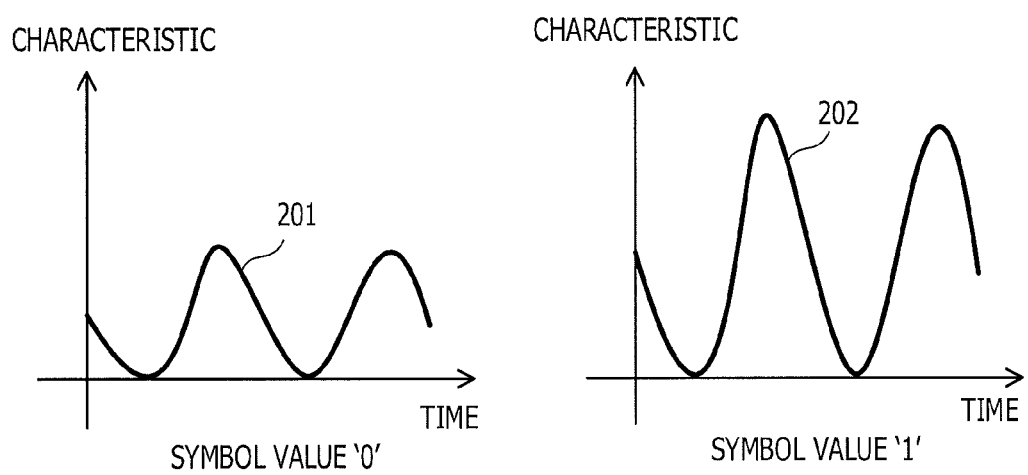
FIG. 2 is a diagram illustrating an example of a relationship between a light emission pattern and a value of a symbol to be superposed.

FIG. 2 is a diagram illustrating an example of a relationship between a light emission pattern and a value of a symbol to be superposed. Referring to FIG. 2, the axis of abscissa represents time and the axis of ordinate represents a characteristic of light emitted from the signal transmission device 1. A light emission pattern 201 and a light emission pattern 202 correspond to symbol values "0" and "1," respectively. In both of the light emission pattern 201 and the light emission pattern 202, a characteristic of light periodically varies together with passage of time. However, the amplitude of the symbol value "0" is defined to approximately ½ in comparison with the amplitude of the symbol value "1." By making the amplitude of the characteristic of light with respect to the time variation different between different symbol values in this manner, the signal transmission device 1 may superpose information on light emitted from the irradiation unit 14. It is to be noted that the relationship between the light emission pattern and the value of the symbol is not limited to this. Details of the relationship between the light emission pattern and the value of the symbol are hereinafter described.

Even if the hue itself of light emitted from the signal transmission device 1 varies as a result of reflection by the arbitrary object 3, the variation pattern of light after reflection along a time series includes a similarity relationship with the light emission pattern. Accordingly, even in the case in which the signal reception device 2 receives light emitted from the irradiation unit 14 of the signal transmission device 1 and reflected by the arbitrary object 3, if the frequency characteristic or the like of the fluctuation pattern of the received light is analyzed to specify a light emission pattern, then the signal reception device 2 may decode the information superposed on the light emitted from the irradiation unit 14 by the signal transmission device 1.

The signal transmission device 1 of the working example 1 disclosed as above may transmit information superposed on light to the signal reception device 2 even if the light on which the information is superposed may not be received directly by the signal reception device 2. It is to be noted that such a signal transmission device 1 as just described may be utilized in the following mode on the industry. For example, if, in a retail store, incoming light on which information relating to a commodity is superposed is irradiated upon the commodity (which corresponds to the arbitrary object 3) and a user who is interested in the commodity picks up an image of the commodity using a multi-functional portable terminal having an image pickup unit (for example, a camera), then a Web site associated with the commodity may be displayed on a display unit of the multi-functional portable terminal.

It is to be noted that, in this case, the following configuration may be adopted. In particular, a system manager of the communication system 100 registers a content (for example, information relating to a commodity) into an identification data (ID) management server and the ID management server distributes the ID to the system manager. Then, the system manager sets the ID to the signal transmission device 1, and the signal transmission device 1 irradiates incoming light on which a signal of the ID is superposed on the commodity. Then, the signal reception device 2 picks up an image of the commodity by a camera and detects the ID from the reflected light. The signal reception device 2 queries the ID management server by using the detected ID, and the ID management server distributes a content corresponding to the ID to the signal reception device 2. Further, if incoming light on which information relating to a moving object such as a singer or an actor on a stage (information such as a profile) is superposed is irradiated on the moving object and the user picks up an image of the singer or actor using the multi-functional portable terminal, then the profile of the singer or actor may be displayed on the display unit of the multi-functional portable terminal.

Also the signal transmission device 1 of the working example 1 disclosed as above may transmit information superposed on light to the signal reception device 2 even when the light on which the information is superposed may not be received directly by the signal reception device 2. However, the inventors newly found out that, when incoming light is irradiated on an arbitrary object, the light is influenced such that it is absorbed by the surface of the object. This is described in the following.

Figure 3:
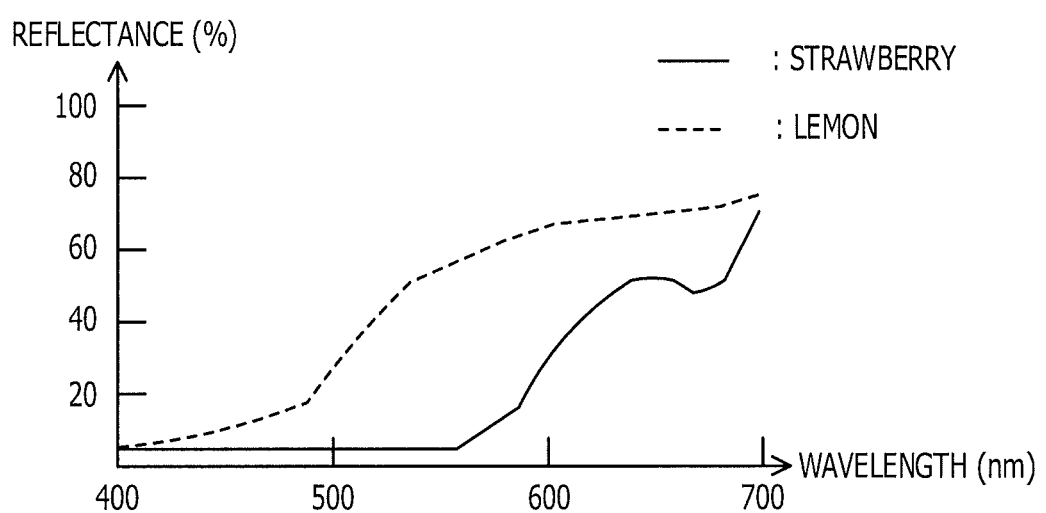
FIG. 3 is a diagram illustrating a concept of a reflectance according to a hue of an object.

FIG. 3 is a diagram illustrating a concept of a reflectance according to a hue of an object. It is to be noted that the reflectance may otherwise be referred to as spectral reflectance. When incoming light is incident to an arbitrary object 3, the intensity of reflected light observed actually is the product of the intensity of the incoming light and the reflectance represented by the expression given below. It is to be noted that, for the convenience of description, the intensity of incoming light is referred to as first intensity and the intensity of the reflected light is referred to as second intensity.

$$C(\lambda)=E(\lambda)\times R(\lambda) \qquad \text{(Expression 1)}$$

In the above expression 1, $C(\lambda)$ is the second intensity (intensity of the reflected light) at an arbitrary wavelength $\lambda$; $E(\lambda)$ is the first intensity (intensity of the incoming light) at the wavelength $\lambda$; and $R(\lambda)$ is the reflectance (which may be referred to also as spectral reflectance) at the wavelength $\lambda$. Further, the first intensity or the second intensity is, in other words, the amount of light, and it is possible to use, as a unit for the amount of light, one of a luminous flux (lm), a luminosity (cd), a luminance ($cd/m^2$) and an illuminance (lx). Further, in addition to such units for the light amount for which absolute values are used, also it is possible to use a ratio such as, for example, relative energy or specific energy to a reference value of 1.0 where the amount of light of a wavelength of the highest intensity is determined as the reference value. It is to be noted that the following description is given assuming that the unit of the first intensity and the second intensity is a luminance ($cd/m^2$) for the convenience of description.

As may be recognized from FIG. 3, for example, if incoming light of a wavelength of blue (for example, the wavelength of 450 nm) is irradiated upon a strawberry (whose hue is red) and a lemon (whose hue is yellow), then the incoming light is absorbed by both of them. On the other hand, if incoming light of a wavelength of green (for example, the wavelength of 550 nm) is irradiated upon a strawberry and a lemon, then while the strawberry absorbs the incoming light, the lemon reflects the incoming light. Further, if incoming light of a wavelength of red (for example, the wavelength of 650 nm) is irradiated upon a strawberry and a lemon, then both of them reflect the incoming light. In this manner, absorption of light occurs depending upon the hue of the arbitrary object 3 upon which the incoming light is irradiated. In the following, an influence when absorption of light occurs is described.

Figure 4A:
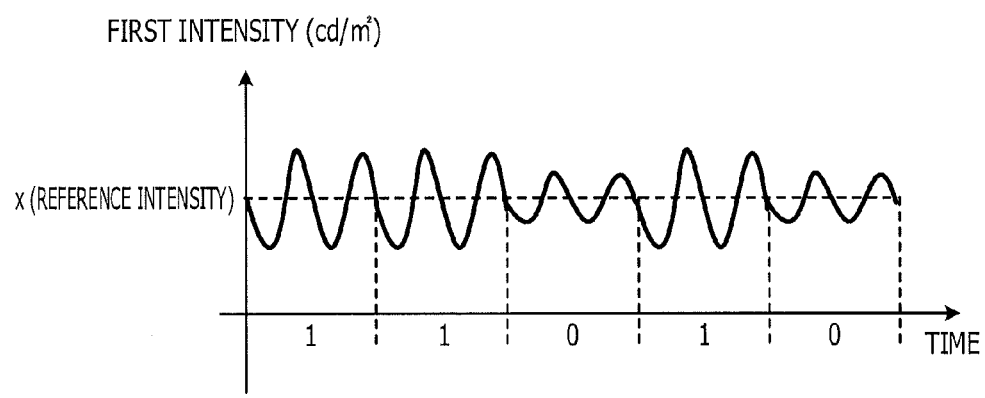
FIG. 4A is a diagram illustrating a relationship between time and a first intensity of incoming light.
Figure 4B:
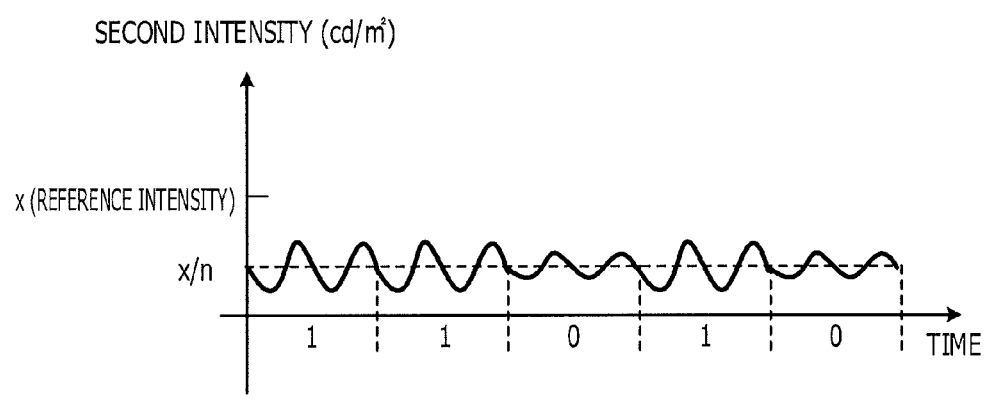
FIG. 4B is a diagram illustrating a relationship between time and a second intensity of reflected light.

FIG. 4A is a diagram illustrating a relationship between time and the first intensity of incoming light. As described hereinabove, for example, by varying the first intensity of incoming light along a time series, a signal (which may be referred to also as information) including an arbitrary symbol may be represented. FIG. 4B is a diagram illustrating a relationship between time and the second intensity of reflected light. It is to be noted that, on the axis of abscissa in FIGS. 4A and 4B, a symbol value corresponding to the amplitude of the first intensity is described additionally. In FIG. 4B, the second intensity of reflected light is an intensity when the incoming light in FIG. 4A is irradiated upon the arbitrary object 3 having a reflectance of 1/n. It may be recognized that the second intensity of the reflected light is attenuated to 1/n by absorption of light. In this case, it may be confirmed that, for example, the boundary between the end of a symbol of "1" and the beginning of another symbol of "0" is unclear. It is to be noted that, in this case, also the amplitude itself of the signal including a symbol attenuates in proportion to the attenuation amount of the second intensity. Since the attenuation itself of the second intensity corresponds to original appearance of the arbitrary object 3 when the incoming light is irradiated upon the arbitrary object 3, the attenuation does not matter specifically. However, since the attenuation of an amplitude of a signal including a symbol signifies attenuation of the signal intensity, also the decoding accuracy (which may be referred to also as detection accuracy) of a symbol degrades. It is to be noted that this problem arises similarly also when the phase or the frequency is modulated to represent a value of a symbol. This signifies that also a signal having a modulated phase or frequency naturally has an amplitude and the attenuation of the amplitude attenuates the signal intensity. Therefore, as the attenuation amount of the signal intensity increases, the influence of surrounding environmental light that makes a factor of noise increases relatively, and it becomes difficult to detect a phase or frequency component from the perspective of the signal to noise ratio. Therefore, it became apparent by the intensive verification of the inventors that the attenuation of the second intensity by absorption of light may make a factor of degradation of the decoding accuracy of a signal.

As described above, it was found by the intensive verification of the inventors that, where incoming light is irradiated upon the arbitrary object 3, by excluding the influence of attenuation of the second intensity by absorption of light, even when light on which information is superposed may not be received directly by the signal reception device 2, it becomes possible to transmit the information superposed on the light to the signal reception device 2 with a higher degree of accuracy than that in the working example 1. While the newly found technical matter or subject by the intensive verification of the inventors described above is taken into consideration, different working examples are disclosed below. It is to be noted that the working example 1 described above may be regarded as a comparative example with the working example 2 described below.

Working Example 2

Figure 5:
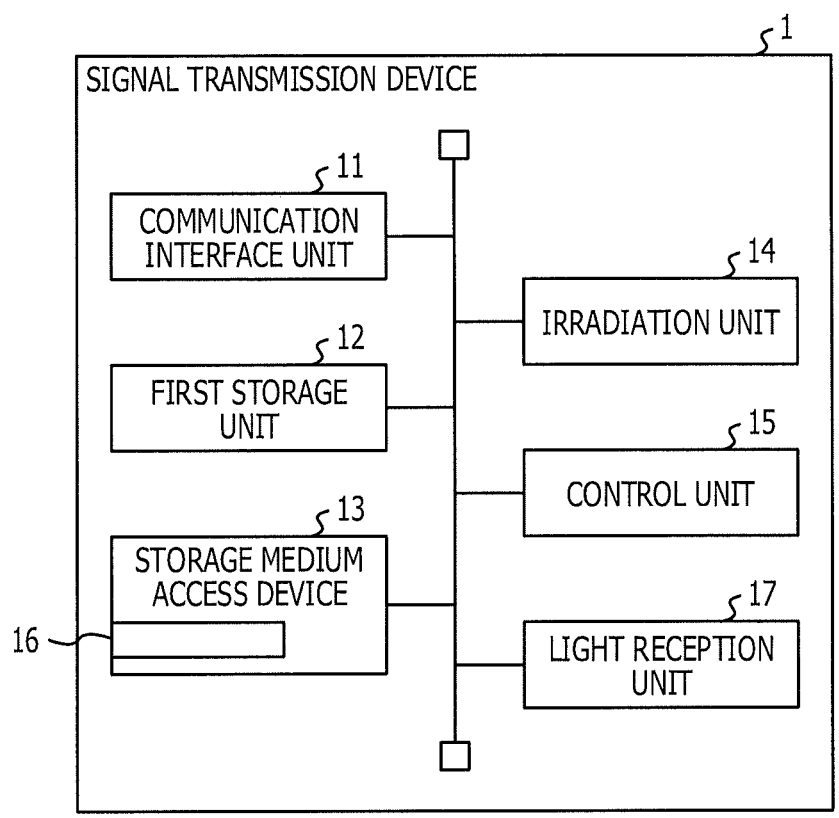
FIG. 5 is a functional block diagram of a signal transmission device.
Figure 6:
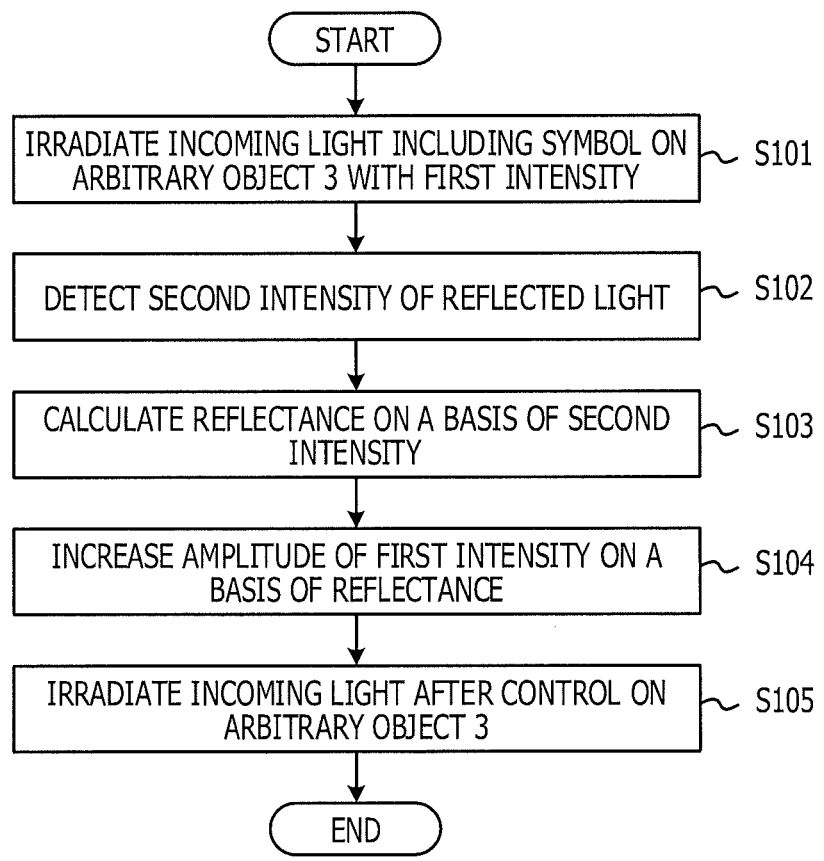
FIG. 6 is a flow chart of a signal transmission process of a signal transmission device.

FIG. 5 is a functional block diagram of a signal transmission device. The signal transmission device depicted in FIG. 5 may be the signal transmission device 1 depicted in FIG. 1. The signal transmission device 1 includes a communication interface unit 11, a first storage unit 12, a storage medium access device 13, the irradiation unit 14, a control unit 15 and a light reception unit 17. FIG. 6 is a flow chart of a signal transmission process of the signal transmission device 1. In the working example 2, a flow of the signal transmission process by the signal transmission device 1 depicted in FIG. 6 is described in an associated relationship with description of the individual functions of the functional block diagram of the signal transmission device 1 depicted in FIG. 5. The signal transmission device 1 superposes information to be transmitted, which is acquired through the communication interface unit 11 or the storage medium access device 13 or is stored in advance in the first storage unit 12, on light emitted from the irradiation unit 14, and then transmits the information.

The communication interface unit 11 includes a communication interface for coupling, for example, the signal transmission device 1 to a wire or wireless communication network and a control circuit for the communication interface. The communication interface unit 11 passes information received from a different device through the communication network to the control unit 15. It is to be noted that the communication interface unit 11 is not necessarily a necessary device but may be used suitably as occasion demands.

The first storage unit 12 includes, for example, a non-volatile read-only semiconductor memory and a readable/writable volatile semiconductor memory. The first storage unit 12 stores therein information to be transmitted, which is, for example, acquired through the communication interface unit 11 or read in from the storage medium access device 13. Further, the first storage unit 12 stores various kinds of information and programs that are utilized in order for the control unit 15 to perform a transmission process. For example, the first storage unit 12 stores, for each symbol value, data representative of a light emission pattern corresponding to the symbol value. The data representative of a light emission pattern includes, for example, a phase and a period (frequency) of the light emission pattern at a point of time of starting of control of light from the irradiation unit 14 in accordance with the light emission pattern, light amounts (first intensity) corresponding to a maximum value and a minimum value of a characteristic of light, and so forth. Further, where the information to be transmitted is fixed, the first storage unit 12 may store therein data representative of a light emission pattern of each symbol included in the information in advance. Further, although details are hereinafter described, the first storage unit 12 may store therein in advance a table not depicted in which a relationship between wavelengths of incoming light and reflectances of an arbitrary object 3 to which incoming light is introduced is stored through prior learning by a user.

The storage medium access device 13 is a device that accesses a storage medium 16 such as, for example, a magnetic disk, a semiconductor memory card or an optical storage medium. The storage medium access device 13 reads in a computer program for a transmission process to be executed by the control unit 15 or information to be transmitted, which is stored, for example, in the storage medium 16, and passes the read-in computer program or information to the control unit 15. It is to be noted that the storage medium access device 13 is not necessarily a necessary device but may be used suitably as occasion demands.

The irradiation unit 14 includes at least one light emitting element capable of changing a characteristic of light to be emitted along a time series, and a driving circuit. The driving circuit drives at least one light emitting element in accordance with a control signal from the control unit 15 so that the characteristic (for example, the first intensity ($cd/m^2$)) of light to be emitted from the at least one light emitting element. Further, the irradiation unit 14 may use a known technique such as, for example, projector mapping to introduce the incoming light to a plurality of arbitrary locations of the arbitrary object 3.

The characteristic of light capable of being changed along a time series may be, for example, the first intensity ($cd/m^2$) that is an amount of light per unit time period. In this case, the irradiation unit 14 includes at least one light emitting element whose first intensity may be changed along a time series such as, for example, at least one of a red LED, a green LED and a blue LED, a white LED or an organic electroluminescence (EL) element.

The irradiation unit 14 irradiates incoming light, which includes a symbol with which the incoming light has been changed, in response to a signal to be transmitted with the first intensity on the arbitrary object 3. In other words, the irradiation unit 14 superposes information on light to be emitted from the irradiation unit 14 by changing a characteristic of the light to be emitted in a time series in accordance with a light emission pattern corresponding to the value of a symbol included in the information to be transmitted in accordance with a control signal from the control unit 15. It is to be noted that the process just described corresponds to step S101 of the flow chart depicted in FIG. 6.

The control unit 15 includes one or a plurality of processors and a peripheral circuit or circuits. The control unit 15 controls the entire signal transmission device 1. When the control unit 15 receives information to be transmitted from the storage medium access device 13 or through the communication interface unit 11, it stores the information once into the first storage unit 12. When the control unit 15 is to execute a transmission process, it reads in information to be transmitted from the first storage unit 12 and divides the information in a unit of a symbol. Then, the control unit 15 reads in, for each symbol, data representative of a light emission pattern corresponding to the value of the symbol from the first storage unit 12. Then, the control unit 15 controls the irradiation unit 14 so that the characteristic of light to be emitted is varied in accordance with the light emission pattern along a time series.

The light reception unit 17 includes a light emitting element such as, for example, a photodiode. The light reception unit 17 receives reflected light reflected from the arbitrary object 3 and detects the second intensity of the reflected light. It is to be noted that the process just described corresponds to step S102 of the flowchart depicted in FIG.

6. It is to be noted that the light reception unit 17 may be attached integrally to the signal transmission device 1 or may be disposed separately at a place at which the signal reception device 2 may be used. Where the light reception unit 17 is disposed separately at a place at which the signal reception device 2 may be used, control wherein the influence of interference of illumination light is taken into consideration may be performed. Alternatively, the light reception unit 17 may be incorporated in the signal reception device 2.

It is to be noted that, in the signal transmission device 1, the timing at which the transmission process is to be executed may be set in advance. Alternatively, the control unit 15 may start the transmission process in response to a starting instruction signal for the transmission process from a different device received in response to an operation from a user interface unit not depicted or through the communication interface unit 11. Alternatively, the control unit 15 may execute the transmission process repetitively after every fixed period.

(Controlling Method 1 for Incoming Light by the Control Unit 15)

The control unit 15 controls the irradiation unit 14 to irradiate light, whose first intensity that is one of spectral characteristics is known, (for example, light of a wavelength of white ($E(\lambda_W)$)), as incoming light upon an arbitrary object 3. The light reception unit 17 receives reflected light corresponding to the incoming light. Then, the control unit 15 calculates a reflectance on the basis of the first intensity of the incoming light and the second intensity of the reflected light received by the light reception unit 17. It is to be noted that the process just described corresponds to step S103 of the flow chart depicted in FIG. 6. The control unit 15 causes the amplitude of the first intensity to increase on the basis of the reflectance so that the attenuation amount of the second intensity of the reflected light corresponding to the incoming light introduced to the arbitrary object 3 from the first intensity is compensated for. It is to be noted that the process just described corresponds to step S104 of the flow chart depicted in FIG. 6. For example, the control unit 15 divides the second intensity by the first intensity to calculate a reflectance and multiplies the amplitude of the first intensity by a reciprocal number of the reflectance. The control unit 15 controls the irradiation unit 14 to irradiate the incoming light that has the first intensity after the amplitude of the first intensity is controlled upon the arbitrary object 3. It is to be noted that the process just described corresponds to step S105 of the flow chart depicted in FIG. 6.

Here, the control unit 15 may calculate the reflectance by transforming the expression 1 given hereinabove in such a manner as given by the following expression:

$$R(\lambda_W)=C(\lambda_W)/E(\lambda_W) \quad \text{(Expression 2)}$$

It is to be noted that, in the expression 2 described above, $C(\lambda_W)$ represents the second intensity (intensity of the reflected light) at the wavelength $\lambda_W$ of white light, $E(\lambda_W)$ represents the first intensity (intensity of the incoming light) at the wavelength $\lambda_W$ of white light, and $R(\lambda_W)$ represents the reflectance at the wavelength $\lambda_W$ of white light.

Then, for example, when the second intensity of the reflected light is equal to 1/n time ($=R(\lambda_W)$) the first intensity of the incoming light $E(\lambda_W)$, if the first intensity of the incoming light $E(\lambda_W)$ is equal to n times, then the reflected light $C(\lambda_W)$ is represented as given by the following expression:

$$C(\lambda_W)=nE(\lambda_W) \times R(\lambda_W)=nE(\lambda_W) \times 1/n = E(\lambda_W) \quad \text{(Expression 3)}$$

As may be recognized from the expression 3 above, by multiplying the first intensity of the incoming light by a reciprocal number of the reflectance, the second intensity of the reflected light is equal to the first intensity of the incoming light. Here, as described hereinabove, also the amplitude itself of the signal including a symbol attenuates in proportion to the attenuation amount of the second intensity. Further, since the attenuation itself of the second intensity corresponds to the original appearance when the incoming light is irradiated upon the arbitrary object 3, it does not matter specifically. Therefore, the influence of attenuation of the amplitude of the first intensity (in other words, attenuation of the signal intensity) by absorption of light may be canceled, for example, by multiplying the amplitude of the first intensity of the incoming light by the reciprocal number of the reflectance. It is to be noted that the control unit 15 need not necessarily multiply the amplitude of the first intensity of the incoming light by the reciprocal number itself of the reflectance. As described above, only it is significant for the control unit 15 to cause the amplitude of the first intensity to increase on the basis of the reflectance so that the attenuation amount of the second intensity of the reflected light corresponding to the incoming light introduced to the arbitrary object 3 from the first intensity is compensated for.

Figure 7A:
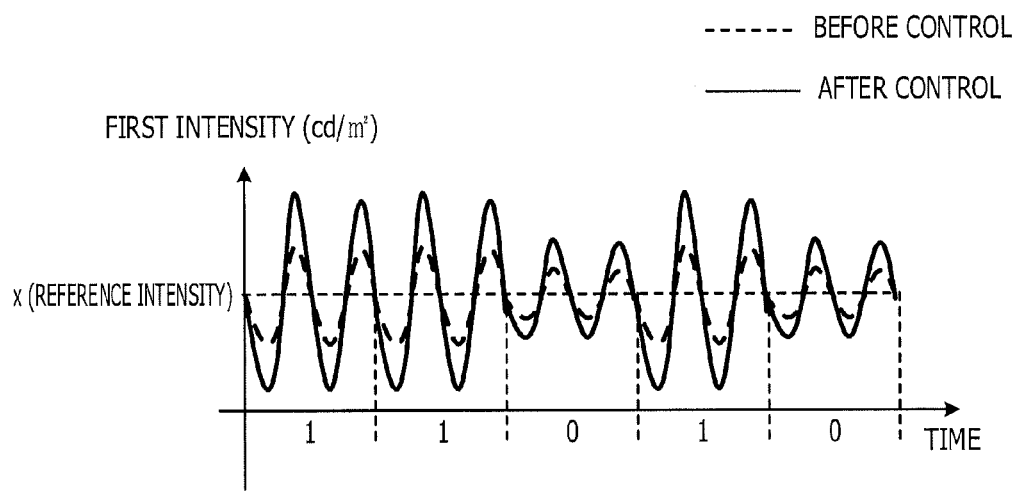
FIG. 7A is a diagram illustrating comparison between an amplitude of a first intensity of incoming light after control by a control unit and an amplitude of a first intensity of incoming light before control.

FIG. 7A is a diagram illustrating comparison between the amplitude of the first intensity of the incoming light after the control by the control unit 15 and the amplitude of the first intensity of the incoming light before the control. In FIG. 7A, a waveform of a solid line indicates a signal including a symbol of the first intensity after the control, and a waveform of a broken line indicates a signal including a symbol of the first intensity before the control. It is to be noted that, on the axis of abscissa of FIG. 7A, a symbol value corresponding to the amplitude of the first intensity is described additionally. The amplitude of the waveform of the solid line after the control is controlled to n times the amplitude of the waveform of the broken line before the control. Here, by making the average value (reference intensity x) of the first intensity equal between the values before and after the control, the control unit 15 may make the brightness of the first intensity before the control originally emitted from the irradiation unit 14 and the apparent brightness equal to each other. It is to be noted that only it is significant for the control unit 15 to control the amplitude of the first intensity to n times and, for example, to increase the light amount of the first intensity from the light amount of the first intensity before the control as occasion demands.

Figure 7B:
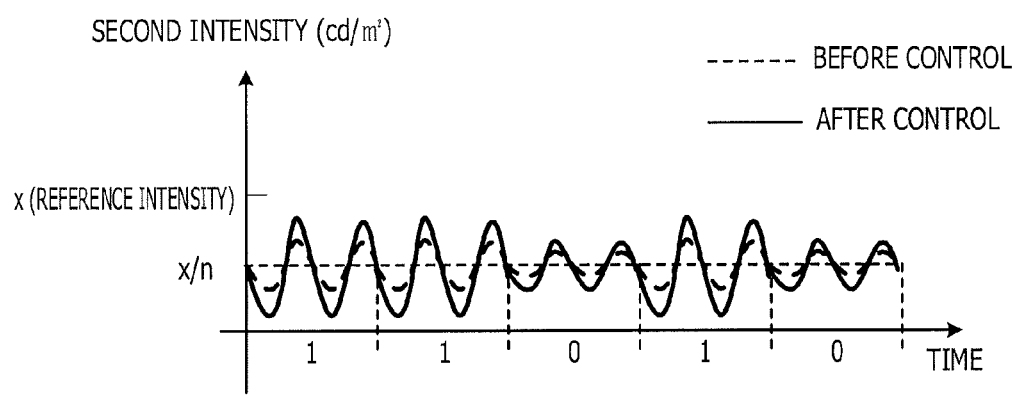
FIG. 7B is a diagram illustrating comparison between an amplitude of a second intensity of reflected light corresponding to incoming light after control by a control unit and an amplitude of a second intensity of reflected light corresponding to incoming light before control.

FIG. 7B is a diagram illustrating comparison between the amplitude of the second intensity of the reflected light corresponding to the incoming light after the control by the control unit 15 and the amplitude of the second intensity of the reflected light corresponding to the incoming light before the control. It is to be noted that a symbol value corresponding to the amplitude of the second intensity is provided additionally along the axis of abscissa in FIG. 7B. In FIG. 7B, a waveform of a solid line indicates a signal of the reflected light corresponding to the incoming light after the control, and a waveform of a broken line indicates a signal of the reflected light corresponding to the incoming light before the control. The amplitude of the signal (solid line) of the reflected light corresponding to the incoming light after the control is same as the amplitude of the first intensity of the incoming light before the control of FIG. 7A. Thus, it may be recognized that the influence of the attenuation of the amplitude of the first intensity by absorption of light is canceled.

The control unit 15 may control the amplitude of the first intensity also when incoming light of a plurality of hues (wavelengths) is used. For example, description is given of a case in which the irradiation unit 14 includes a red LED, a green LED and a blue LED. First, it is assumed that the wavelength $\lambda_R$ of light irradiated from the red LED is 650 (nm); the wavelength $\lambda_G$ of light irradiated from the green LED is 550 (nm); and the wavelength $\lambda_B$ of light irradiated from the blue LED is 450 (nm). Further, it is assumed that the incoming light has, at the wavelengths thereof, the first intensities (for example, the luminance (cd/m$^2$)) of $E(\lambda_R)$ =100 (cd/m$^2$), $E(\lambda_G)$=100 (cd/m$^2$), and $E(\lambda_B)$=100 (cd/m$^2$), respectively. It is to be noted that the first intensities of the wavelengths are measured and known in advance.

Here, it is assumed that the second intensities at the wavelengths of the reflected light corresponding to the incoming light received by the light reception unit 17 are $C(\lambda_R)$=60 (cd/m$^2$), $C(\lambda_G)$=10 (cd/m$^2$), and $C(\lambda_B)$=80 (cd/m$^2$), respectively. In this case, if the (spectral) reflectance at the wavelengths is calculated in accordance with the expression 2 given hereinabove, then $R(\lambda_R)=C(\lambda_R)/E(\lambda_R)=0.6$, $R(\lambda_G)=C(\lambda_G)/E(\lambda_G)=0.1$, and $R(\lambda_B)=C(\lambda_B)/E(\lambda_B)=0.8$ are obtained. The control unit 15 determines the magnifications of the amplitudes of the first intensities of the incoming light to be irradiated from the red LED, the green LED, and the blue LED to $1/R(\lambda_R)=1/0.6=1.67$, $1/R(\lambda_G)=1/0.1=10$, and $1/R(\lambda_B)=1/0.8=1.25$, respectively, and uses the magnifications for control thereby.

On the other hand, if the first storage unit 12 further stores a hue of the arbitrary object 3 and the hue of the arbitrary object 3 is white, then the irradiation unit 14 may irradiate white incoming light on the arbitrary object 3 and the light reception unit 17 may receive reflected light of the white incoming light. In this case, the control unit 15 may handle the second intensity of the reflected light of the white incoming light as the first intensity of the incoming light. This is because, when the hue of the arbitrary object 3 is white, almost all of the incoming light is reflected. Therefore, the influence of the fluctuation of the first intensity caused by time-dependent degradation or the like of the irradiation unit 14 may be canceled.

(Controlling Method 2 for Incoming Light by the Control Unit 15)

For example, if a table in which wavelengths of incoming light and reflectances of an object upon which the incoming light is irradiated are stored in advance is stored in the first storage unit 12 through prior learning by the user, then the control unit 15 may refer to a reflectance of the object stored in the table and perform control similar to the control of the method given by the expression 3 above. It is to be noted that, where the (controlling method 2 for incoming light by the control unit 15) is applied, the signal transmission device 1 need not include the light reception unit 17 disposed therein.

In the following, control and light emission patterns of the irradiation unit 14 are described in detail. In the working example 2, the light emission pattern is, for example, a periodical variation pattern in which a characteristic of light varies in a sine wave as time passes as depicted in FIG. 2. It is to be noted that the light emission pattern is not limited to this example but may be, for example, a pattern in which a characteristic of light varies periodically like a triangular shape or a rectangular pulse. Further, the light emission pattern is not limited to a pattern which exhibits a periodical variation but may be, for example, a pattern in which a characteristic of light varies monotonically within a period corresponding to one symbol. For example, in a light emission pattern corresponding to the symbol value "0," a characteristic of light varies monotonically such that light emitted from the irradiation unit 14 at a start point of time of a period corresponding to a symbol has a first characteristic value and light emitted from the irradiation unit 14 at an end point of time of the period has a second characteristic value. On the other hand, in a light emission pattern corresponding to the symbol value "1," a characteristic of light varies monotonically in such a manner that light emitted from the irradiation unit 14 at a start point of time of a period corresponding to a symbol has a second characteristic value and light emitted from the irradiation unit 14 at an end point of time of the period has a first characteristic value.

The length of one period of a light emission pattern is set, for example, to several times a reciprocal number of an image pickup rate of the image pickup unit provided in the signal reception device 2 so that the signal reception device 2 may reproduce the light emission pattern even at the image pickup rate of the image pickup unit. For example, where the image pickup rate of the signal reception device 2 is 30 frames/second, the length of one period of the light emission pattern is set, for example, to 100 milliseconds to one second.

The control unit 15 divides, for example, information to be transmitted in a unit of a bit sequence having one or a plurality of bits and determines each bit sequence as one symbol. The control unit 15 reads out data representative of a light emission pattern corresponding to a value of a symbol from the first storage unit 12. Then, the control unit 15 sets a period having a given length for each symbol. The control unit 15 controls the irradiation unit 14 to repeat a light emission pattern corresponding to the symbol value for one to several cycles within the period.

It is to be noted that the control unit 15 may include a given symbol sequence (for example, "01010101") as a preamble at a given position of information to be transmitted, for example, at the top of the information. Alternatively, the control unit 15 may include, in the information to be transmitted, an error detection code such as a cyclic redundancy check (CRC) code. If the control unit 15 includes such a symbol sequence and an error detection code as described above in the information to be transmitted, the signal reception device 2 may accurately decode the information transmitted thereto.

The control unit 15 may utilize various modulation methods utilized in wireless communication as the modulation method for a light emission pattern in accordance with the value of a symbol. For example, the control unit 15 may cause one symbol to correspond to one bit. In this case, the control unit 15 reverses the phase by 180 degrees between a light emission pattern corresponding to the symbol value "0" and another light emission pattern corresponding to the symbol value "1" as in the case of the binary phase-shift keying (BPSK) method depicted in FIG. 2. Alternatively, the control unit 15 may cause two bits to correspond to one symbol. In this case, the control unit 15 may set a light emission pattern in which a characteristic of light fluctuates periodically such that the light emission patterns corresponding to the four values ("00," "01," "10" and "11"), which may be assumed by a symbol, are different in phase by 90 degrees from each other as in the case of the quadriphase phase-shift keying (QPSK) method.

Alternatively, the control unit 15 may modulate the variation width (hereinafter referred to as amplitude level) of a characteristic of light in response to the value of a symbol. In this case, the control unit 15 may set a light emission pattern wherein the combination of an amplitude level and a phase is different among different values that may be assumed by a symbol like quadrature amplitude modulation (QAM). Thereupon, the control unit 15 may monotonically increase, at a certain symbol value, the amplitude level within a period corresponding to the symbol, but may monotonically decrease, at another symbol value, the amplitude level within a period corresponding to the symbol.

Alternatively, the control unit 15 may multiplex information to be transmitted utilizing a plurality of light emission patterns having frequencies different from each other (namely, having periods different from each other). In particular, the control unit 15 may represent, for each of a plurality of frequencies, a symbol with a light emission pattern in accordance with one of the related art modulation methods described above and then inverse Fourier transform the light emission pattern of each frequency like orthogonal frequency-division multiplexing (OFDM). It is to be noted that the inverse Fourier transform is an example of frequency-time conversion. Then, the control unit 15 may control the irradiation unit 14 so as to vary the characteristic of light in a time series in accordance with the light emission pattern obtained by the frequency-time conversion.

Further, it may be supposed that environmental light around the signal transmission device 1, especially, light whose light emission characteristic varies periodically, becomes noise to the signal reception device 2 and the decoding accuracy of transmitted information by the signal reception device 2 is deteriorated by the noise. Therefore, the control unit 15 may spread information to be transmitted to a plurality of frequencies as in spectrum spreading utilized in the code division multiple access (CDMA) method. Then, the control unit 15 controls the irradiation unit 14 so as to vary the characteristic of light along a time series in accordance with a light emission pattern obtained by spreading the information to be transmitted to a plurality of frequencies.

Now, a characteristic of light that varies along a time series in a light emission pattern is described. The characteristic of light that varies along a time series in a light emission pattern may be the first intensity that is an amount of light per unit time period. For example, the control unit 15 sets a plurality of sampling points (for example, 10 to 20 points) within one cycle of a light emission pattern. Then, the control unit 15 may determine the first intensity that is a light emission amount per unit time period of a light emitting element provided in the irradiation unit 14 at each sampling point in accordance with the light emission pattern.

In order to use the first intensity that is a light emission amount per unit time period of the light emitting element provided in the irradiation unit 14 as the first intensity at each sampling point determined in such a manner as described above, the control unit 15 may control each light emitting element, for example, in accordance with a pulse width modulation (PWM) method. In the PWM method, the first intensity of incoming light to be emitted from the light emitting element is adjusted with a ratio (duty ratio) of a period of time within which the light emitting element is on to a unit time period. In this case, each interval obtained by equally dividing one cycle by a number of sampling points set in one cycle of the light emission pattern becomes an interval (whose length is represented by T) corresponding to one sampling point. Then, the control unit 15 determines the time period t within which the light emitting element is kept on within the interval T in accordance with the following expression:

$$t = T \times n/M \quad \text{(Expression 4)}$$

In the above expression 4, M is a maximum first intensity per unit time period of the light emitting element, and n is the first intensity per unit time period at the sampling point.

FIG. 8A is a diagram illustrating a time variation of the first intensity per unit time period of a light emitting element determined in response to a light emission pattern. In FIG. 8A, the axis of abscissa represents time, and the axis of ordinate represents the first intensity indicative of a light amount. A graph 601 indicated by a dotted line represents a time variation of the first intensity per unit time period of a light emitting element determined in response to a light emission pattern. Also it is possible to consider the graph 601 as a graph after the amplitude of the first intensity of incoming light is multiplied by a reciprocal number of the reflectance. Also it is possible to consider the graph 601 as a graph before the amplitude of the first intensity of incoming light is controlled. It is to be noted that each of points 602 on the graph 601 represents a sampling point.

FIG. 8B is a diagram illustrating a relationship between the first intensity of a light emitting element and a period within which current is supplied to the light emitting element, namely, a period within which the light emitting element is kept on, in accordance with a PWM method. In FIG. 8B, the axis of abscissa represents time, and the axis of ordinate represents current flowing to the light emitting element. Graphs 611 and 612 represent relationships between time and current flowing to the light emitting element. For example, it is assumed that the first intensity per unit period of time at the sampling point t1 in FIG. 8A is n. In this case, in order to control the light emitting element to an on state so that the first intensity per unit time period may be n, the control unit 15 may supply current to the light emitting element for a continuous interval T×(n/M) within the interval T corresponding to one sampling point, for example, as indicated by the graph 611. Alternatively, the control unit 15 may divide the interval within which current is supplied to the light emitting element into a plurality of sub intervals P1, P2 and P3 within the interval T corresponding to one sampling point as indicated by the graph 612. Also in this case, only it is significant to make the total of lengths of the sub intervals equal to T×(n/M).

In order that blinking of the light emitting element by the PWM method may not be perceived by a human being (user), preferably the control unit 15 controls the length T of the interval corresponding to one sampling point so as to be equal to or shorter than 1/100 seconds within which the eye of a human being is difficult to see a flicker by blinking. Further, preferably the length T of the interval is shorter than the exposure period when the image pickup unit of the signal reception device 2 performs one image pickup. By such setting of the length T of the interval, a region in which an object irradiated by light from the irradiation unit 14 is captured on an image produced by the image pickup unit of the signal reception device 2 indicates a brightness corresponding to the amount of light emitted from the irradiation unit 14. Further, in order that blinking of the light emitting element by the PWM method may not be perceived by the user, the control unit 15 may set the modulation frequency of the light emitting element by the PWM method to 500 Hz or more.

It is to be noted that, where it is possible to adjust the first intensity of the light emitting elements provided in the irradiation unit 14 in a cycle shorter than the length T of an interval corresponding to one sampling point, the control unit 15 may adjust the first intensity of each light emitting element so that a light emitting amount corresponding to each sampling point may be obtained.

With the signal transmission device according to the working example 2, when incoming light is irradiated on an arbitrary object 3, the influence of attenuation of the second intensity by absorption of light is excluded. Therefore, even where light on which information is superposed may not be received directly by the signal reception device 2, the information superposed on the light may be transmitted to the signal reception device 2 with a degree of accuracy higher than that in the working example 1.

Working Example 3

Figure 9:
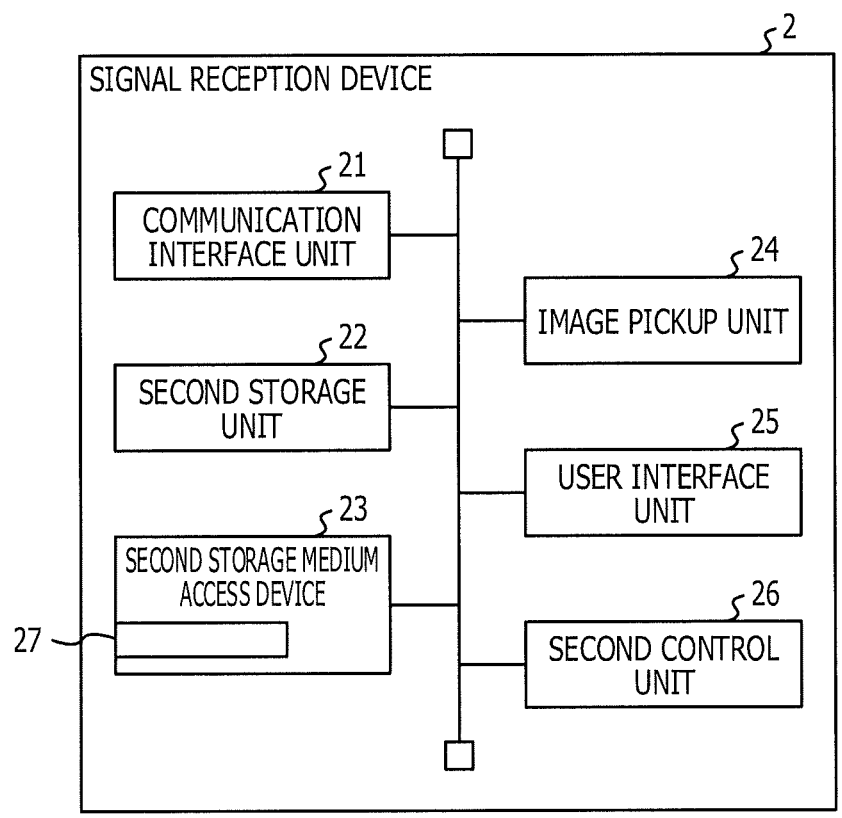
FIG. 9 is a functional block diagram of a signal reception device.

Now, a signal reception device corresponding to the signal transmission device 1 of the working example 1 or the working example 2 described hereinabove is described. FIG. 9 is a functional block diagram of a signal reception device. The signal reception device depicted in FIG. 9 may be the signal reception device 2 depicted in FIG. 1. The signal reception device 2 may be, for example, a portable terminal or an installation type device having an image pickup unit. The signal reception device 2 includes a communication interface unit 21, a second storage unit 22, a second storage medium access device 23, an image pickup unit 24, a user interface unit 25 and a second control unit 26. In the signal reception device 2, the image pickup unit 24 picks up an image of an image pickup range, which includes at least part of a region upon which light from the signal transmission device 1 is irradiated, at a given image pickup rate by a plural number of times along a time series. The signal reception device 2 decodes information transmitted thereto from the signal transmission device 1 by analyzing the plurality of images obtained by the image pickup by the image pickup unit 24.

The communication interface unit 21 includes a communication interface for coupling the signal reception device 2, for example, to a wire or wireless communication network and a control circuit for the communication interface. The communication interface unit 21 transmits information received from the second control unit 26 to a different device such as, for example, a server through the communication network. Further, the communication interface unit 21 passes information received from the different device to the second control unit 26.

The second storage unit 22 includes, for example, a read-only nonvolatile semiconductor memory and a readable/writable volatile semiconductor memory. The second storage unit 22 stores, for example, a plurality of images produced along a time series by the image pickup unit 24 for a period of time of a reception process. Further, the second storage unit 22 stores various kinds of information and programs to be utilized by the second control unit 26 to perform a reception process. Furthermore, the second storage unit 22 may store therein information transmitted thereto from the signal transmission device 1 and then decoded.

The second storage medium access device 23 is a device for accessing a storage medium 27 such as, for example, a magnetic disk, a semiconductor memory card and an optical storage medium. The second storage medium access device 23 reads in a computer program for a reception process stored, for example, in the storage medium 27 and to be executed by the second control unit 26 and passes the computer program to the second control unit 26.

The image pickup unit 24 includes an image sensor formed from a two-dimensional array of solid-state image pickup elements having a sensitivity to light emitted from the irradiation unit 14 of the signal transmission device 1 such as, for example, charge coupled device (CCD) or complementary metal oxide semiconductor (CMOS) elements, and an imaging optical system for forming an image of an image pickup range on the image sensor. It is to be noted that preferably the signal reception device 2 is disposed such that at least part of a region upon which incoming light from the irradiation unit 14 of the signal transmission device 1 is irradiated may be included in the image pickup range, for example, such that the arbitrary object 3 of FIG. 1 may be included in the image pickup range. While the signal reception device 2 performs a reception process, the image pickup unit 24 performs image pickup at a given image pickup rate (for example, 30 frames/second) and produces an image every time image pickup is performed. Every time an image is produced, the image pickup unit 24 outputs the image to the second control unit 26.

The user interface unit 25 includes a device such as, for example, a touch panel display unit on which the user operates the signal reception device 2 or the signal reception device 2 displays information to the user. The user interface unit 25 outputs an operation signal according to an operation of the user, for example, an operation signal for the instruction to start a reception process, to the second control unit 26. Further, the user interface unit 25 displays various kinds of information received from the second control unit 26 and an image produced by the image pickup unit 24 thereon. For example, the user interface unit 25 may display, together with an image produced by the image pickup unit 24, information transmitted from the signal transmission device 1 and decoded by a reception process.

The second control unit 26 includes one or a plurality of processors and peripheral circuits. The second control unit 26 controls the entire signal reception device 2. Further, the second control unit 26 frequency analyzes a plurality of images generated along a time series by the image pickup unit 24 to decode information transmitted from the signal transmission device 1.

Figure 10:
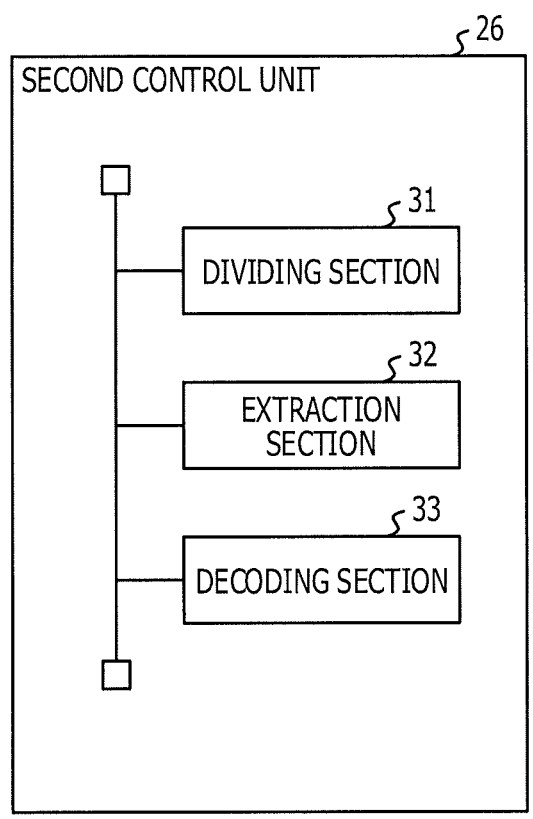
FIG. 10 is a first functional block diagram of a second control unit.

FIG. 10 is a first functional block diagram of a second control unit. The second control unit depicted in FIG. 10 may be the second control unit 26 depicted in FIG. 9. The second control unit 26 includes a dividing section 31, an extraction section 32 and a decoding section 33. The sections included in the second control unit 26 are, for example, software modules implemented by a computer program that operates on a processor provided in the second control unit 26. Alternatively, the sections provided in the second control unit 26 may be incorporated as firmware, which implements the functions of the sections, in the signal reception device 2. Besides, the sections provided in the second control unit 26 may be incorporated, for example, as a Web application that operates on a Web browser.

Figure 11:
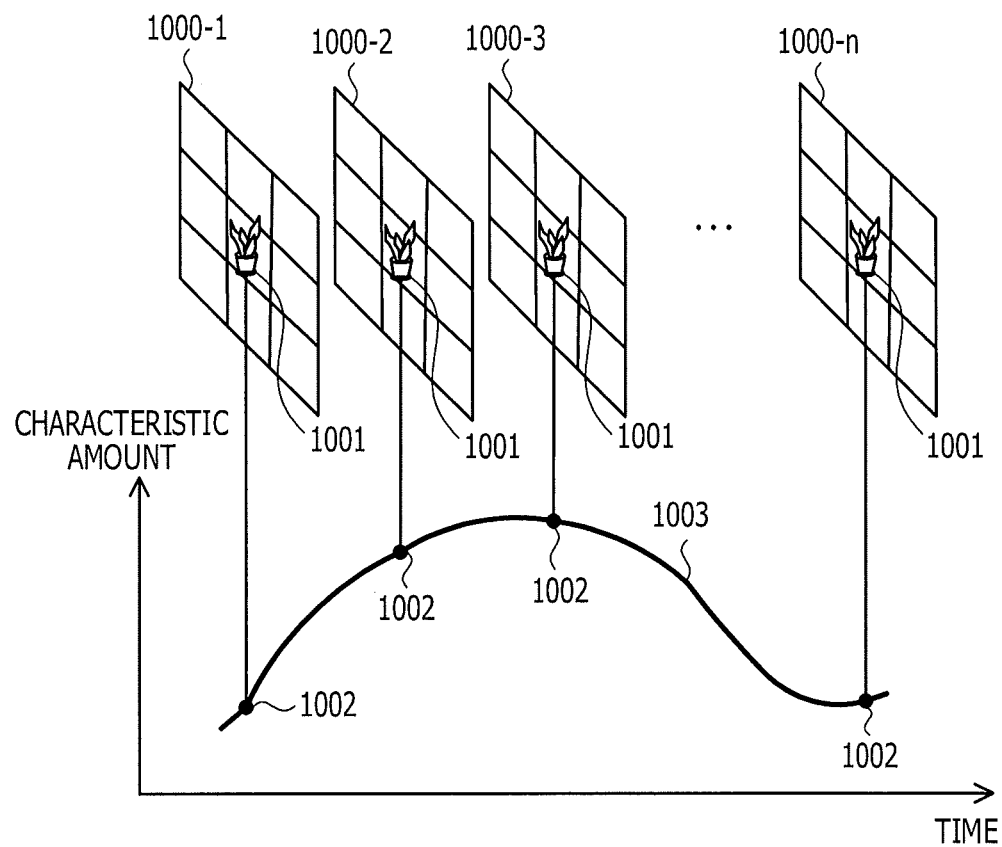
FIG. 11 is a diagram illustrating a concept of a reception process of a signal reception device.

FIG. 11 is a diagram illustrating a concept of a reception process of a signal reception device. The signal reception device described with reference to FIG. 11 may be the signal reception device 2 depicted in FIG. 9. If an object illuminated with light from the irradiation unit 14 of the signal transmission device 1 is captured in images generated by the image pickup unit 24, then pixel values included in a region in which the object is captured are influenced by a variation of a characteristic of reflected light corresponding to incoming light emitted from the irradiation unit 14. Therefore, the dividing section 31 divides each of images 1000-1, 1000-2, 1000-3, . . . , and 1000-n generated by the image pickup unit 24 into a plurality of partial areas 1001. The extraction section 32 extracts a characteristic amount 1002 representative of a characteristic of light emitted from the irradiation unit 14 from the partial areas 1001. The decoding section 33 checks the time variation of the characteristic amount 1002 to specify a light emission pattern 1003. Then, the decoding section 33 decodes the value of a symbol corresponding to the light emission pattern 1003.

The dividing section 31 divides each image into a plurality of partial areas. For example, the dividing section 31 may divide each image into two to four areas in the horizontal direction and the vertical direction. Further, the dividing section 31 may divide each image by a plurality of different dividing methods. For example, the dividing section 31 may divide each image into two areas in both of the horizontal direction and the vertical direction to set four partial areas to each image and divide each image into three areas in both of the horizontal direction and the vertical direction to set nine partial areas to each image. This setting raises the possibility that the partial areas may be able to be set so that any of the partial areas may be mostly occupied with a region in which an object illuminated with light from the signal transmission device 1 is represented or with the irradiation unit 14 itself of the signal transmission device 1. The dividing section 31 passes information representative of the partial areas of each image (for example, positions of the boundaries between the partial areas) to the extraction section 32.

The extraction section 32 extracts, from the partial areas of the images, a characteristic amount representative of a characteristic of light which varies in a time series in accordance with a light emission pattern of reflected light corresponding to incoming light emitted from the irradiation unit 14 of the signal transmission device 1. For example, where the characteristic of light which varies in a time series is the second intensity that is an amount of light per a unit time period, the extraction section 32 extracts an average value or a median of the second intensity ($sd/m^2$) of pixels in each partial area as a characteristic amount. It is to be noted that the characteristic amount is not limited to the example described above, but the extraction section 32 may extract various characteristic amounts, which vary in a time series in accordance with a characteristic of light which varies in a light emission pattern, for example, a sum total, a variance or a standard deviation of the luminance value or a specific color component in a partial area, as a characteristic amount. Besides, the extraction section 32 may extract an average value in a partial area of difference values between pixel values of pixels positioned at same positions in two temporally successive images as a characteristic amount. The extraction section 32 passes the characteristic amount for each partial area of each image to the decoding section 33.

The decoding section 33 specifies a light emission pattern from variations in the order of a time series of the characteristic amounts extracted for the individual partial areas, and decodes the value of a symbol corresponding to the light emission pattern.

As described above, where a characteristic of light emitted from the irradiation unit 14 of the signal transmission device 1 varies periodically in accordance with a light emission pattern, the time variation of the characteristic amount in a partial area in which an arbitrary object 3 illuminated by the signal transmission device 1 is captured includes a frequency component in the time axis direction in accordance with the variation cycle of the light emission pattern. For example, where the characteristic of light from the signal transmission device 1 varies in a sine wave as described hereinabove, the frequency component of the characteristic amount in the time axis direction includes a specific frequency component corresponding to the sine wave.

Therefore, the decoding section 33 generates a one-dimensional vector by lining up characteristic amounts extracted in the order of a time series from partial areas, in which the same object is captured, from within a plurality of images included in a focused period of a length equal to a period corresponding to one symbol. It is to be noted that, when the signal reception device 2 is stationary and besides static object exists within an image pickup range of the signal reception device 2, a partial area in which the same object is captured in a plurality of images may be determined as the partial area at the same position of each of the images. The decoding section 33 Fourier transforms the one-dimensional vector. Then, the decoding section 33 extracts, for each partial area, a spectrum of a frequency same as the period of the light emission pattern from the frequency components obtained by the Fourier transform.

The decoding section 33 selects, from among the partial areas, a partial area in which the amplitude level of the extracted spectrum is in the maximum. Alternatively, the decoding section 33 may select a partial area in which the amplitude level of the extracted spectrum is equal to or higher than a given threshold value. Consequently, the decoding section 33 may select a partial area in which an object illuminated by the signal transmission device 1 or the irradiation unit 14 itself of the signal transmission device 1 is captured. Then, the decoding section 33 detects, from the extracted spectrum with regard to the selected partial area, a component having a value according to the light emission pattern, for example, a phase or an amplitude level of the cyclic variation of the characteristic of the light at a given point of time within a focused period (for example, at a start point of time or an end point of time of a focused period).

It is to be noted that there is the possibility that a period set for each symbol by the signal transmission device 1 and the focused period may be displaced from each other. Therefore, the decoding section 33 successively displaces the focused period one by one frame along a time series to perform the process described above to detect a component having a value according to a light emission pattern for each focused period. In this case, if the focused period and the period set for each symbol by the signal transmission device 1 coincide with each other, then the value of the detected component indicates an extreme value. Therefore, the decoding section 33 may determine the extreme value as a component having a value according to the light emission pattern. If an extreme value is obtained once, then since it is considered that a focused period corresponding to the extreme value coincides with a period corresponding to one symbol, the decoding section 33 may set a later focused period with reference to the focused period. Then, the decoding section 33 detects a component having a value according to the light emission pattern for each focused period. It is to be noted that the decoding section 33 may otherwise specify a light emission pattern by a method other than the method described above. For example, the decoding section 33 may calculate a difference value in characteristic amount between images adjacent in time to each other within a focused period and check increase or decrease of the characteristic amount on the basis of the difference value to specify a light emission pattern.

The decoding section 33 lines up the detected components in the order of a time series. If a given symbol sequence (for example, "01010101") is included as a preamble in information to be transmitted as described hereinabove, then the decoding section 33 extracts, from the sequence of the detected components, a portion that coincides with a symbol sequence corresponding to the preamble. Then, the decoding section 33 may associate the detected component and the value of the symbol with each other so that the detected components in the extracted portion and the values of the symbols may coincide with each other. Alternatively, if an error detection code such as a CRC is included in information to be transmitted, then the decoding section 33 may associate the detected components and the values of the symbol with each other so that the error of the symbol may be minimized using the error detection code. Besides, the decoding section 33 may refer to a reference table representative of a corresponding relationship between detected components and values of a symbol to determine a value of a symbol according to the detected component. It is to be noted that the reference table is stored, for example, in the second storage unit 22 in advance.

The decoding section 33 decodes information transmitted thereto by lining up the decoded values of the symbols in a given order. Then, the second control unit 26 outputs the decoded information to a different device through the communication interface unit 21. Alternatively, the second control unit 26 executes a process according to the decoded information. For example, if the decoded information is information for the instruction to start up a given application, then the second control unit 26 starts up the application. Alternatively, the second control unit 26 may cause the decoded information to be displayed on the user interface unit 25.

Figure 12:
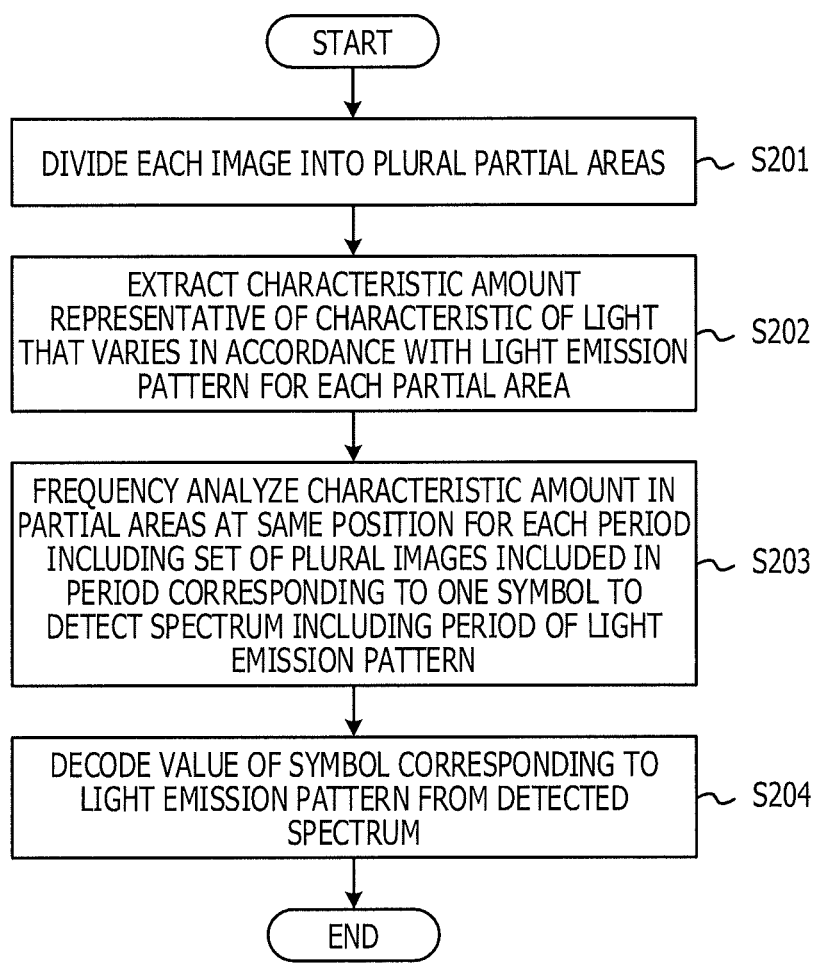
FIG. 12 is an operation flow chart of a reception process executed by a signal reception device.

FIG. 12 is an operation flow chart of a reception process executed by a signal reception device. The signal reception device described with reference to FIG. 12 may be the signal reception device 2 depicted in FIG. 9. The dividing section 31 of the second control unit 26 divides each image into a plurality of partial areas (step S201). Then, the extraction section 32 of the second control unit 26 extracts a characteristic amount representative of a characteristic of light which varies in accordance with the light emission pattern for each partial area (step S202).

The decoding section 33 performs, for each period that includes a set of a plurality of images included in a period corresponding to one symbol, frequency analysis of the characteristic amounts in the partial areas at the same position to detect a spectrum including a period of the light emission pattern (step S203). Then, the decoding section 33 decodes a value of the symbol corresponding to the light emission pattern from the detected spectrum for each period to decode the information transmitted thereto (step S204). Then, the second control unit 26 ends the reception process.

As described above, the present communication system 100 may superpose information on light to be emitted from the signal transmission device 1 and transmit the light to the signal reception device 2 together with the information. In the communication system 100, the light emission pattern that varies in a time series is changed in response to the value of a symbol to superpose the information on the light to be emitted from the signal transmission device 1. Therefore, even if the signal reception device 2 may not directly receive light emitted from the signal transmission device 1, it may decode the information by detecting the light emission pattern that varies in a time series. Further, since the communication system 100 may transmit information even if the variation of a characteristic of light emitted from the signal transmission device 1 with respect to passage of time is moderated, a variation of the characteristic of light may be made less likely to be sensed by a user.

It is to be noted that the signal reception device 2 may include a terminal including an image pickup unit and a different device such as, for example, a server coupled to the terminal through a communication network. In this case, every time the terminal generates an image, the terminal may transmit the image to the server through the communication network together with identification information for specifying the terminal such as, for example, an IP address of the terminal. Then, a processor of the server may execute processes of the control unit of the signal reception device 2 according to the working example described above to decode information transmitted thereto from the signal transmission device 1. Further, the server may refer to the identification information for specifying the terminal to return the decoded information to the terminal. Alternatively, every time a processor the terminal includes generates an image, it may perform the process of the dividing section 31 and the process of the extraction section 32 for the image to extract a characteristic amount for each partial area. Then, the terminal may transmit the characteristic amount for each partial area extracted from each image to the sever through the communication network together with the identification information for specifying the terminal. Then, the processor of the server may execute the process of the decoding section 33 of the signal reception device 2 according to the working example described above to decode the information transmitted thereto from the signal transmission device 1.

With the signal reception device 2 in the working example 3, even when the signal reception device 2 may not directly receive light on which information is superposed, the information superposed on the light may be decoded.

Working Example 4

In the working example 2 described hereinabove, the signal transmission device 1 is disclosed, the signal transmission device 1 making it possible to exclude an influence of attenuation of the second intensity by absorption of light when incoming light is irradiated upon an arbitrary object 3. Since the exclusion of an influence of attenuation of the second intensity by absorption of light is possible not only with the signal transmission device 1 but also with the signal reception device 2, this is disclosed below. It is to be noted that a signal reception device disclosed in the working example 4 may be regarded as a device corresponding to the signal transmission device 1 disclosed in the working example 1.

Figure 13:
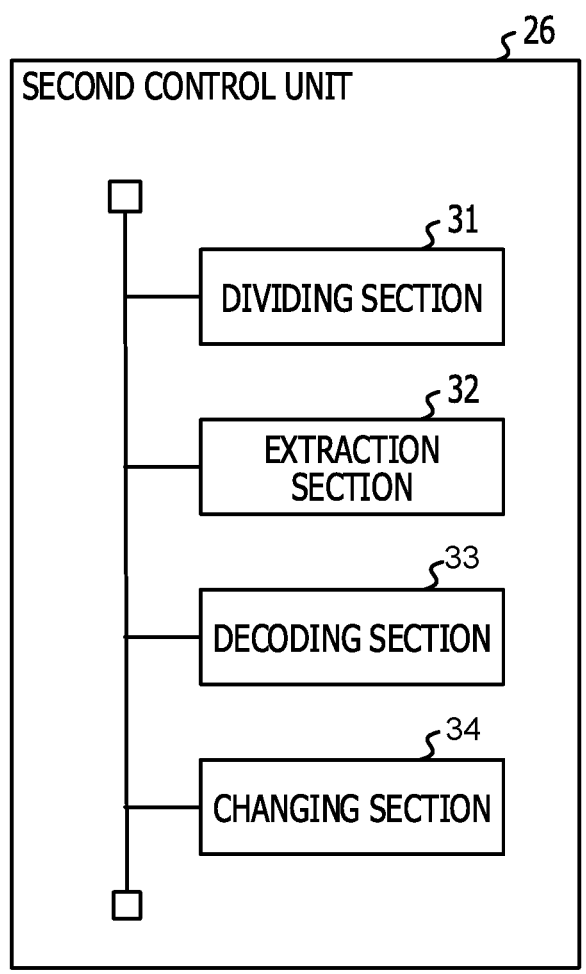
FIG. 13 is a second functional block diagram of a second control unit.

FIG. 13 is a second functional block diagram of a second control unit. A second control unit 26 of a signal reception device 2 according to the working example 4 includes a dividing section 31, an extraction section 32, a decoding section 33 and a changing section 34. The components the second control unit 26 includes are software modules implemented, for example, by a computer program which operates on a processor the second control unit 26 includes. Alternatively, the components the second control unit 26 includes may be incorporated as firmware that implements the functions of the components in the signal reception device 2. Besides, the components the second control unit 26 includes may be implemented, for example, as a Web application that operates on a Web browser. It is to be noted that, since the dividing section 31, the extraction section 32 and the decoding section 33 include functions similar to those of the working example 3, detailed description of the components is omitted. It is to be noted that it is assumed that, in the working example 4, wavelengths of incoming light and reflectances corresponding to hues of an arbitrary object 3 are stored in advance in the second storage unit 22.

In FIG. 13, the changing section 34 is a hardware circuit, for example, by wired logic. The changing section 34 may otherwise be a functional module implemented by a computer program executed by the signal reception device 2. The changing section 34 corrects the second intensity on the basis of the reflectance stored in the second storage unit 22. For example, the changing section 34 corrects the second intensity on the basis of the reflectance so that the attenuation amount of the second intensity with respect to the first intensity may be compensated for. For example, the second control unit 26 may correct the second intensity by multiplying the amplitude of the second intensity by a reciprocal number of the reflectance.

With the signal reception device 2 according to the working example 4, the influence of attenuation of the second intensity by absorption of light when the signal transmission device 1 irradiates the incoming light on an arbitrary object 3 may be excluded.

Further, with a different modification, where the signal reception device 2 is a device of the portable type, even if the arbitrary object 3 illuminated by the signal transmission device 1 is in a stopping state, the position of the arbitrary object 3 on an image may move as time passes by movement of the signal reception device 2 itself. Therefore, the control unit of the signal reception device 2 may perform a tracking process utilizing an optical flow or the like to specify a partial area in which the same arbitrary object 3 is captured between a plurality of images lined up along a time series. Then, the second control unit 26 of the signal reception device 2 may execute the process of the decoding section using a characteristic amount extracted from the partial area in which the same arbitrary object 3 is captured in the images within the focused period. Further, even in a case in which there is the possibility that the arbitrary object 3 illuminated by the signal transmission device 1 may be a moving object, the second control unit 26 of the signal reception device 2 may execute the process of the decoding section using characteristic amounts extracted from the partial area in which the same arbitrary object 3 specified by the tracking process is captured. Consequently, even when the signal reception device 2 and the arbitrary object 3 illuminated by the signal transmission device 1 move relative to each other, the signal reception device 2 may decode information transmitted thereto from the signal transmission device 1 accurately.

With another different modification, if it is supposed that the area of a region in which the arbitrary object 3 irradiated by light emitted from the irradiation unit 14 of the signal transmission device 1 is captured on an image to be produced by the image pickup unit of the signal reception device 2, is equal to or greater than a given area, then the processing of the dividing section 31 in the signal reception device 2 may be omitted. It is to be noted that the given area may be, for example, one half the image size. In this case, the extraction section 32 may extract a characteristic amount from the entire image.

Furthermore, a computer program for causing a computer to implement the functions the control unit 15 of the signal transmission device 1 according to the working examples includes may be provided in the form in which it is recorded on a computer-readable medium. Similarly, a computer program for causing a computer to implement the functions the second control unit 26 of the signal reception device 2 according to the working examples described above includes may be provided in the form in which it is recorded on a computer-readable medium.

The components of the devices described hereinabove with reference to the drawings need not necessarily be configured physically as depicted in the drawings. In other words, the particular forms of distribution and integration of the devices are not limited to those depicted in the drawings, but all or part of them may be configured in a functionally or physically distributed or integrated manner in an arbitrary unit in response to various loads, situations of use and so forth. Further, the various processes described in the description of the working examples described above may be implemented by executing a program prepared in advance on a computer such as a personal computer or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A signal transmission device, comprising:
a memory; and
a processor coupled to the memory and the processor configured to:
  irradiate incoming light, which includes one or more symbols with which the incoming light has been varied in response to a signal to be transmitted, on an object with a first intensity; and
  control an amplitude of the incoming light so that a second intensity of reflected light of the incoming light irradiated on the object is compensated for to be equal to or at least similar to the first intensity on a basis of a reflectance of the incoming light irradiated on the object,
  the incoming light with the controlled amplitude decodable into the one or more symbols by a signal reception device that receives reflected light of the incoming light with the controlled amplitude.

2. The device according to claim 1,
wherein the controlling increases the amplitude of the incoming light so that an attenuation amount of a second intensity of reflected light of the incoming light irradiated on the object from the first intensity is compensated for.

3. The device according to claim 1, further comprising:
storing the reflectance corresponding to the incoming light and the object into the memory in advance.

4. The device according to claim 2, further comprising:
receiving the reflected light,
wherein the controlling calculates the reflectance on a basis of the first intensity and the second intensity of the reflected light.

5. The device according to claim 2,
wherein the controlling calculates a value obtained by dividing the second intensity by the first intensity as the reflectance and multiplies the amplitude of the first intensity by a reciprocal number of the reflectance.

6. The device according to claim 2,
wherein the first intensity or the second intensity is a luminance value; and
wherein the controlling generates the incoming light including a phase, an amplitude or a frequency different for each value of the symbol by varying the luminance value.

7. The device according to claim 3,
wherein the memory further stores a hue of the object;
wherein the irradiating irradiates white incoming light on the object where the hue of the object is white;
wherein the receiving receives reflected light of the white incoming light; and
wherein the controlling handles the second intensity of the reflected light of the white incoming light as the first intensity of the incoming light.

8. A signal transmission method, comprising:
irradiating incoming light, which includes one or more symbols with which the incoming light has been varied in response to a signal to be transmitted, on an object with a first intensity; and
controlling, by a processor,
an amplitude of the incoming light so that a second intensity of reflected light of the incoming light irradiated on the object is compensated for to be equal to or at least similar to the first intensity on a basis of a reflectance of the incoming light irradiated on the object,
the incoming light with the controlled amplitude decodable into the one or more symbols by a signal reception device that receives reflected light of the incoming light with the controlled amplitude.

9. The method according to claim 8,
wherein the controlling increases the amplitude of the incoming light so that an attenuation amount of a second intensity of reflected light of the incoming light irradiated on the object from the first intensity is compensated for.

10. The method according to claim 8, further comprising:
storing the reflectance corresponding to the incoming light and the object into a memory in advance.

11. The method according to claim 9, further comprising:
receiving the reflected light,
wherein the controlling calculates the reflectance on a basis of the first intensity and the second intensity of the reflected light.

12. The method according to claim 9,
wherein the controlling calculates a value obtained by dividing the second intensity by the first intensity as the reflectance and multiplies the amplitude of the first intensity by a reciprocal number of the reflectance.

13. The method according to claim 9,
wherein the first intensity or the second intensity is a luminance value; and
wherein the controlling generates the incoming light including a phase, an amplitude or a frequency different for each value of the symbol by varying the luminance value.

14. The method according to claim 10,
wherein the memory further stores a hue of the object;
wherein the irradiating irradiates white incoming light on the object where the hue of the object is white;
wherein the receiving receives reflected light of the white incoming light; and
wherein the controlling handles the second intensity of the reflected light of the white incoming light as the first intensity of the incoming light.

15. A computer-readable non-transitory medium that stores a signal transmission program for causing a computer to execute a process comprising:
irradiating incoming light, which includes one or more symbols with which the incoming light has been varied in response to a signal to be transmitted, on an object with a first intensity; and
controlling an amplitude of the incoming light so that a second intensity of reflected light of the incoming light irradiated on the object is compensated for to be equal to or at least similar to the first intensity on a basis of a reflectance of the incoming light irradiated on the object,
the incoming light with the controlled amplitude decodable into the one or more symbols by a signal reception device that receives reflected light of the incoming light with the controlled amplitude.

16. A signal reception device, comprising:
a memory that stores information indicating a reflectance corresponding to the incoming light and an object; and
a processor coupled to the memory and the processor configured to:
pick up a plurality of images of the object, each of the plurality of images including reflected light of incoming light which includes one or more symbols, the one or more symbols included in the incoming light having been varied in response to a signal to be transmitted;
extract a plurality of second intensities of the reflected light that varies along a time series from within the plurality of images;
change an amplitude of the plurality of second intensities on a basis of the reflectance; and
decode the symbols from the plurality of second intensities.

17. The signal reception device according to claim 16, wherein the processor is configured to:
correct the amplitude of the plurality of second intensities on a basis of the reflectance so that an attenuation amount of the plurality of second intensities from the first intensity is compensated for.

18. A communication system comprising:
a signal transmission device including:
a first memory that stores information indicating a reflectance corresponding to the incoming light and an object, and
a first processor coupled to the first memory; and
a signal reception device including:
a second memory that stores information indicating a reflectance corresponding to the incoming light and an object, and
a second processor coupled to the second memory;
wherein
the first processor is configured to:
irradiate incoming light, which includes one or more symbols with which the incoming light has been varied in response to a signal to be transmitted, on the object with a first intensity, and
control an amplitude of the first intensity on a basis of a reflectance of the incoming light irradiated on the object; and
wherein
the second processor is configured to:
pick up a plurality of images of the object, each of the plurality of images including reflected light of incoming light which includes one or more symbols, the one or more symbols included in the incoming light having been varied in response to a signal to be transmitted, extract a plurality of second intensities of the reflected light that varies along a time series from within the plurality of images, change an amplitude of the plurality of second intensities on a basis of the reflectance, and decode the symbols from the plurality of second intensities.

* * * * *